(12) United States Patent
Li et al.

(10) Patent No.: US 11,309,928 B2
(45) Date of Patent: Apr. 19, 2022

(54) RECEIVER AND CHANNEL ESTIMATION METHOD

(71) Applicant: REALTEK SEMICONDUCTOR CORPORATION, Hsinchu (TW)

(72) Inventors: Yang-Bang Li, Hsinchu (TW); Liang-Wei Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/182,690

(22) Filed: Feb. 23, 2021

(65) Prior Publication Data

US 2021/0266022 A1    Aug. 26, 2021

(30) Foreign Application Priority Data

Feb. 24, 2020    (TW) ................. 109105901

(51) Int. Cl.
*H04L 1/00* (2006.01)
*H04B 1/10* (2006.01)
*H04L 25/03* (2006.01)
*H04L 25/02* (2006.01)

(52) U.S. Cl.
CPC ......... *H04B 1/1036* (2013.01); *H04L 25/024* (2013.01); *H04L 25/03006* (2013.01)

(58) Field of Classification Search
CPC ............. H04L 27/2647; H04L 27/2634; H04L 27/2601; H04L 15/0202; H04L 12/024; H04L 25/03006; H04B 1/1027; H04B 1/123; H04B 10/25752; H04B 1/1036

USPC .................. 375/346, 148, 222, 229
See application file for complete search history.

(56) References Cited

U.S. PATENT DOCUMENTS

| 7,203,256 | B2 | 4/2007 | Lin et al. |
| 7,613,234 | B2 | 11/2009 | Raghavan et al. |
| 10,791,006 | B1* | 9/2020 | Lin .................... H04L 25/03019 |
| 2004/0252755 | A1* | 12/2004 | Jaffe .................... H04L 25/4975 |
| | | | 375/233 |
| 2006/0002462 | A1* | 1/2006 | Park .................. H04L 25/03012 |
| | | | 375/232 |
| 2010/0054315 | A1 | 3/2010 | Huang et al. |
| 2013/0279557 | A1* | 10/2013 | Kolze .................. H04B 1/1027 |
| | | | 375/227 |
| 2014/0169440 | A1* | 6/2014 | Kotagiri ................ H04L 25/063 |
| | | | 375/233 |

\* cited by examiner

*Primary Examiner* — Khai Tran
(74) *Attorney, Agent, or Firm* — WPAT, PC (57) ABSTRACT

A receiver includes an equalizer circuit, a radio frequency interference cancellation circuitry, and a channel estimation circuitry. The equalizer circuit is configured to process a first data signal according to a control signal, in order to generate a second data signal. The radio frequency interference cancellation circuitry is configured to detect a radio frequency interference signal according to the second data signal to generate radio frequency interference information, and to output a correction signal according to the radio frequency interference information, in order to correct the second data signal. The channel estimation circuitry configured to analyze a plurality of sets of signal components in the second data signal, and to utilize a power ratio of one of the plurality of sets of signal components to generate the control signal.

20 Claims, 4 Drawing Sheets

RECEIVER AND CHANNEL ESTIMATION METHOD

BACKGROUND OF THE INVENTION

1. Field of the Invention

The present disclosure relates to a receiver, especially to a receiver able to estimate a channel and a channel estimation method thereof.

2. Description of Related Art

An equalizer circuit has been widely utilized in a receiver to compensate channel attenuation. In order to correctly compensate the channel attenuation, the receiver is required to estimate a length of the channel. In practical applications, the receiver is affected by other noises (e.g., crosstalk, radio frequency interference, etc.) and thus may generate an inaccurate estimation result of the channel length. As a result, the equalizer circuit may provide an inaccurate compensation.

SUMMARY OF THE INVENTION

In some embodiments, a receiver includes an equalizer circuit, a radio frequency interference cancellation circuitry, and a channel estimation circuitry. The equalizer circuit is configured to process a first data signal according to a control signal, in order to generate a second data signal. The radio frequency interference cancellation circuitry is configured to detect a radio frequency interference signal according to the second data signal to generate radio frequency interference information, and to output a correction signal according to the radio frequency interference information, in order to correct the second data signal. The channel estimation circuitry configured to analyze a plurality of sets of signal components in the second data signal, and to utilize a power ratio of one of the plurality of sets of signal components to generate the control signal.

In some embodiments, a channel estimation method includes the following operations: performing an equalization on a first data signal in response to channel estimation information, in order to generate a second data signal; detecting a radio frequency interference signal according to the second data signal to output radio frequency interference information and output a correction signal according to the radio frequency interference information to correct the second data signal; and analyzing a plurality of sets of signal components in the second data signal, and utilizing a power ratio of one of the plurality of sets of signal components according to the radio frequency interference information, in order to generate the channel estimation information.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits. The term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference numbers.

Figure 1:
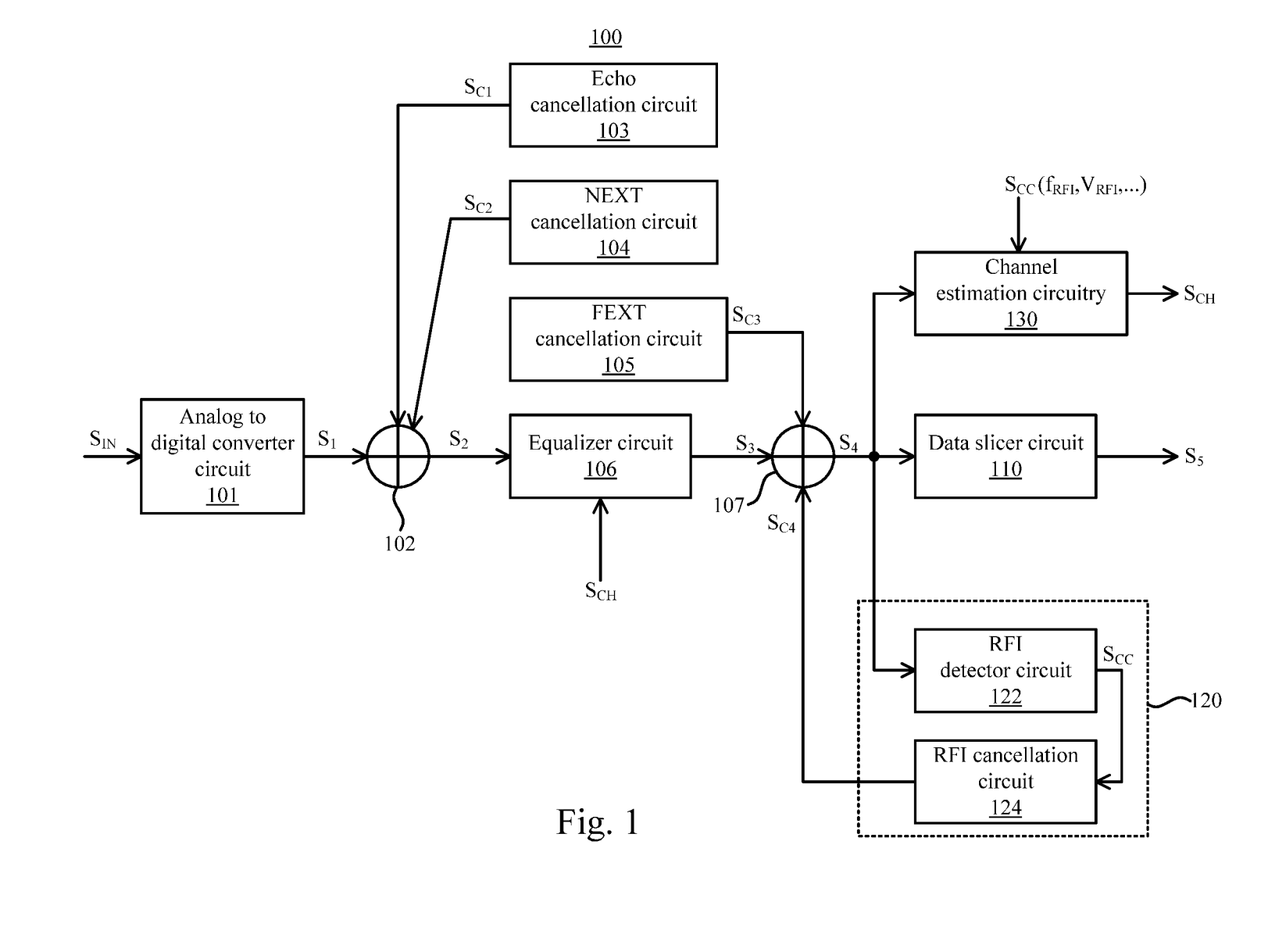
FIG. 1 is a schematic diagram of a receiver according to some embodiments of the present disclosure.

FIG. 1 is a schematic diagram of a receiver 100 according to some embodiments of the present disclosure. In some embodiments, the receiver 100 may be applied with IEEE 802.3 (2.5GBASE-T, 5GBASE-T, 10GBASE-T, etc.) standard. In some embodiments, the receiver 100 may be applied to a Giga Ethernet system.

The receiver 100 includes an analog to digital converter circuit 101, an adder circuit 102, the echo cancellation circuit 103, an near-end crosstalk (NEXT) cancellation circuit 104, a far-end crosstalk (FEXT) cancellation circuit 105, an equalizer circuit 106, an adder circuit 107, a data slicer circuit 110, a radio frequency interference (RFI) cancellation circuitry 120, and a channel estimation circuitry 130.

The echo cancellation circuit 103, the NEXT cancellation circuit 104, and the FEXT cancellation circuit 105 operate as a noise cancellation circuitry. The echo cancellation circuit 103 generates a correction signal $S_{C1}$, in order to reduce impacts from echo of the channel. The NEXT cancellation circuit 104 generates a correction signal $S_{C2}$, in order to reduce near-end crosstalk(s) from adjacent channel(s) in the same device. The FEXT cancellation circuit 105 generates a correction signal $S_{C3}$, in order to reduce far-end crosstalk(s) from other channels in different devices.

The analog to digital converter circuit 101 converts an input signal $S_{IN}$ to a data signal $S_1$. The adder circuit 102 sums up the data signal $S_1$, the correction signal $S_{C1}$, and the correction signal $S_{C2}$, in order to generate a data signal $S_2$. The equalizer circuit 106 sets its internal circuit parameter(s) (which may be, for example, bandwidth of low frequency band, bandwidth of high frequency band, gain of low frequency band, gain of high frequency band, etc.) according to a control signal $S_{CH}$, and processes the data signal $S_2$ to generate a data signal $S_3$. In some embodiments, the equalizer circuit 106 may perform equalization on the data signal $S_2$, in order to compensate signal losses caused by the channel. The adder circuit 107 sums up the data signal $S_3$, the correction signal $S_{C3}$, and a correction signal $S_{C4}$, in order to generate a data signal $S_4$. The data slicer circuit 110 generates a data signal $S_5$ according to the data signal $S_4$.

The RFI cancellation circuitry 120 detects whether the RFI signal exists according to the data signal $S_4$, and generates the correction signal $S_{C4}$, in order to reduce impacts from the RFI signal. In some embodiments, the RFI cancellation circuitry 120 includes a RFI detector circuit 122 and a RFI cancellation circuit 124. The RFI detector circuit 122 analyzes the data signal $S_4$ to detect the RFI signal.

The RFI detector circuit 122 determines a correlation between the data signal $S_4$ and a delayed signal corresponding of the data signal $S_4$, in order to output an accumulated value (not shown), and to compare this accumulated value with a predetermined threshold value to determine whether the RFI signal exists. If the accumulated value is greater than the predetermined threshold value (not shown), the RFI detector circuit 122 determines that the RFI signal exists. The RFI detector circuit 122 further performs a frequency bin search operation according to the accumulated value, in order to determine a frequency $f_{RFI}$ and power $V_{RFI}$ of the RFI signal and to generate RFI information $S_{CC}$ accordingly. The RFI cancellation circuit 124 generates the correction signal $S_{C4}$ according to the RFI information $S_{CC}$, and transmits the same to the adder circuit 107, in order to adjust the data signal $S_4$ to reduce impacts from the RFI signal. In some embodiments, the RFI cancellation circuit 124 may be a filter circuit that performs a least mean square algorithm according to the RFI information $S_{CC}$, in order to generate the correction signal $S_{C4}$.

In some embodiments, the RFI detector circuit 122 may directly analyzes the data signal $S_1$ to generate the RFI information $S_{CC}$. In some embodiments, the RFI detector circuit 122 may include circuit(s) including a kalman filter to detect the RFI signal. In examples of FIG. 1, the RFI detector circuit 122 utilizes the data signal $S_4$ and/or the data signal $S_5$ to detect the RFI signal, where the data signal $S_4$ is (or has been) processed by (or outputted from) the noise cancellation circuitry and the equalizer circuit 106, and the data signal $S_5$ is (or has been) processed by (or outputted from) the data slicer circuit 110. Ideally, impacts from echo/NEXT/FEXT on the data signal $S_4$ (and/or the data signal $S_5$) are relatively low. As a result, under different environments, the RFI detector circuit 122 may obtain a more accurate detection result without utilizing the kalman filter. The implementations of the RFI cancellation circuitry 120 are given for illustrative purposes, and the present disclosure is not limited thereto. Various types of the RFI cancellation circuitry 120 are within the contemplated scope of the present disclosure.

Figure 2:
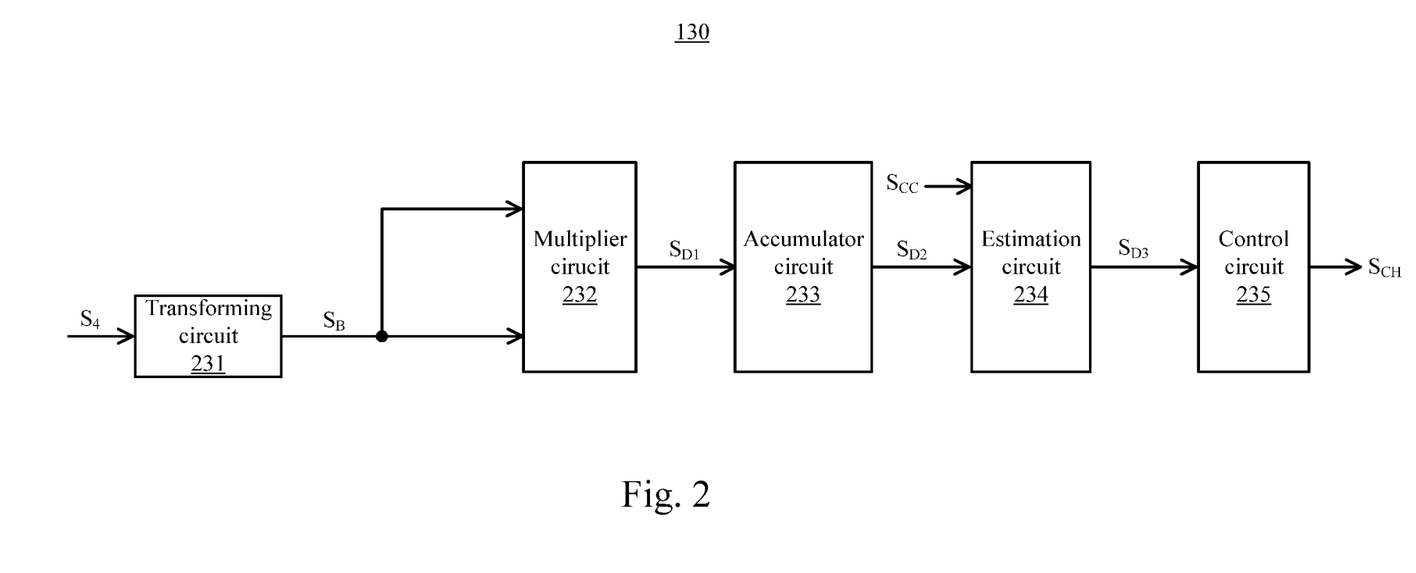
FIG. 2 is a schematic diagram of the channel estimation circuitry in FIG. 1 according to some embodiments of the present disclosure.

The channel estimation circuitry 130 analyzes sets of signal components in the data signal $S_4$ (e.g., SIG1 and SIG2 in FIG. 3), and utilizes a power ratio of one of the sets of signal components according to the RFI information $S_{CC}$, in order to generate channel estimated information (e.g., $S_{D3}$ in FIG. 2). The channel estimation circuitry 130 generates the control signal $S_{CH}$ according to the channel estimated information. As a result, a circuit configuration of the equalizer circuit 106 can be adjusted in response to the channel estimated information. In some embodiments, a "channel" can be a cable connected between the receiver 100 and other device(s). In some embodiments, a "channel" can be a signal path between the receiver 100 and other device(s) for transmitting data.

For example, if the channel is longer, a loss of a high frequency signal transmitted through the channel is higher. Under this condition, a compensation provided from the equalizer circuit 106 to the high frequency signal is greater. Therefore, by analyzing the data signal $S_4$, the channel estimation circuitry 130 is able to estimate a length of the current channel, in order to output the control signal $S_{CH}$ to set circuit parameter(s) of the equalizer circuit 106. Moreover, in order to prevent the estimated length of the current channel from being inaccurate due to the RFI signal, the channel estimation circuitry 130 further selects one of the sets of signal components according to the RFI information $S_{CC}$, and compares signal power in each sets of signals with each other to determine whether the selected set of signals is valid, in order to generate the channel estimated information according to the selected set of signal components. Operations regarding herein will be given with reference to FIGS. 2-4.

FIG. 2 is a schematic diagram of the channel estimation circuitry 130 in FIG. 1 according to some embodiments of the present disclosure. The channel estimation circuitry 130 includes a transforming circuit 231, a multiplier circuit 232, an accumulator circuit 233, an estimation circuit 234, and a control circuit 235.

The transforming circuit 231 transforms the data signal $S_4$ to a frequency domain signal $S_B$. In some embodiments, the transforming circuit 231 performs a fast Fourier transform on the data signal $S_4$, in order to generate the frequency domain signal $S_B$. The multiplier circuit 232 is coupled to the transforming circuit 231 to receive the frequency domain signal $S_B$. The multiplier circuit 232 multiplies the frequency domain signal $S_B$ with the frequency domain signal $S_B$, in order to generate a signal $S_{D1}$. In other words, the signal $S_{D1}$ is a square of a frequency response of the frequency domain signal $S_B$, and is configured to indicate the power of the data signal $S_4$. The accumulator circuit 233 is coupled to the multiplier circuit 232, and is configured to accumulate the signal $S_{D1}$ for a predetermined interval, in order to generate a signal $S_{D2}$. The signal $S_{D2}$ is a sum of power of signal components at each frequency band in the data signal $S_4$.

The estimation circuit 234 is configured to analyze sets of signal components (e.g., SIG1 and SIG2 in FIG. 3) in the data signal $S_4$ according to the signal $S_{D2}$, and to select one of the sets of signal components according to the RFI information $S_{CC}$, in order to generate channel estimated information $S_{D3}$ according to a power ratio of the selected one of the sets of signal components. Operations of the estimation circuit 234 will be described with reference to FIGS. 3-4. The control circuit 235 generates the control signal $S_{CH}$ according to the channel estimated information $S_{D3}$. The channel estimated information $S_{D3}$ indicates an estimated channel length. In some embodiments, the control circuit 235 stores a lookup table that records multiple sets of control parameters corresponding to multiple channel lengths. The control circuit 235 may select at least one set of control parameters from the lookup table according to the channel estimated information $S_{D3}$, and output the selected set of control parameters as the control signal $S_{CH}$. The control circuit 235 may be implemented with digital logic circuit(s), register circuit(s), etc., but the present disclosure is not limited thereto.

In some embodiments, each circuit in the channel estimation circuitry 130 may be implemented with at least one digital signal processor circuit having a computing capability, in order to perform operations in various embodiments. In some embodiments, certain circuits (e.g., the transforming circuit 231, the multiplier circuit 232, the accumulator circuit 233, etc.) in the channel estimation circuitry 130 may be shared with the noise cancellation circuit and/or the RFI cancellation circuitry 120. As a result, circuit area and cost of the receiver 100 can be further saved.

Figure 3:
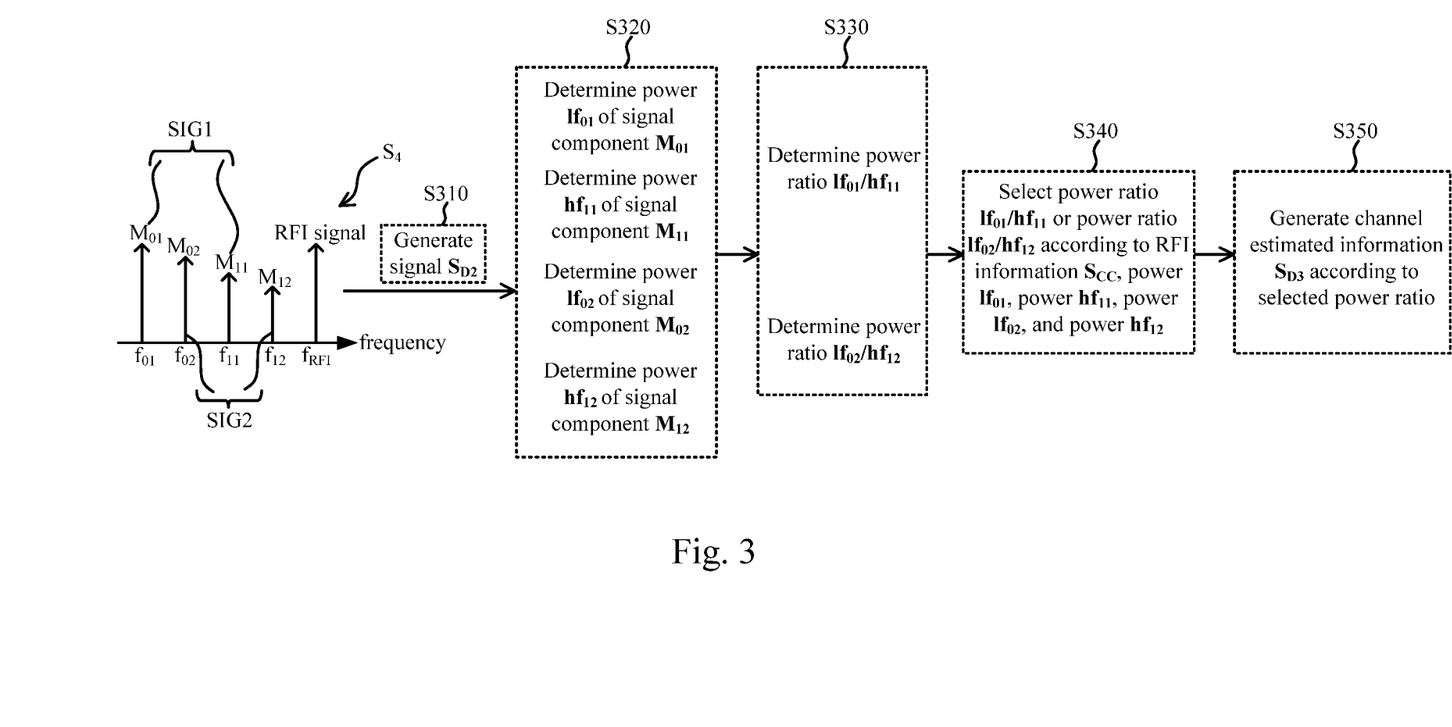
FIG. 3 is a schematic diagram of operations of the estimation circuit in FIG. 2 according to some embodiments of the present disclosure.

FIG. 3 is a schematic diagram of operations of the estimation circuit 234 in FIG. 2 according to some embodiments of the present disclosure. In practical applications, the data signal $S_4$ is formed with multiple signal components. The estimation circuit 234 analyzes sets of signal components in the data signal $S_4$ to generate the channel estimated information $S_{D3}$. For example, the data signal $S_4$ includes a first set of signal components SIG1, a second set of signal components SIG2, and a RFI signal (if exists) having a frequency $f_{RFI}$. The first set of signal components SIG1 includes a signal component $M_{01}$ having a frequency $f_{01}$ and a signal component $M_{11}$ having a frequency $f_{11}$. The second set of signal components SIG2 includes a signal component $M_{02}$ having a frequency $f_{02}$ and a signal component $M_{12}$ having a frequency $f_{12}$. The frequency $f_{01}$ is set to be lower than the frequency $f_{12}$, the frequency $f_{02}$ is set to be lower than the frequency $f_{11}$, and the frequency $f_{11}$ is set to be lower than the frequency $f_{12}$. For example, in applications of IEEE 802.32 5G BASE-T standard, the frequency $f_{01}$ may be about 12.50 MHz, the frequency $f_{02}$ may be about 17.19 MHz, the frequency $f_{11}$ may be about 50 MHz, and the frequency $f_{12}$ may be about 54.69 MHz. The values of the above frequencies are given for illustrative purposes, and the present disclosure is not limited thereto.

It should be understood that, according to practical detection results of the RFI cancellation circuitry 120, the frequency $f_{RFI}$ of the RFI signal may be among the above frequencies, lower than the frequency $f_{01}$, or higher than the frequency $f_{12}$. For ease of understanding, in examples of FIG. 3, the frequency $f_{RFI}$ is higher than the frequency $f_{12}$, but the present disclosure is not limited thereto.

As shown in FIG. 3, in order to analyze the frequency spectrum of the data signal $S_4$, the data signal $S_4$ is processed to be the signal $S_{D2}$ (i.e., operation S310). In some embodiments, the estimation circuit 234 may perform a frequency bin search operation on the signal $S_{D2}$, in order to determine power $lf_{01}$ of the signal component $M_{01}$, power $hf_{11}$ of the signal component $M_{11}$, power $lf_{02}$ of the signal component $M_{02}$, and power $hf_{12}$ of the signal component $M_{12}$ (i.e., operation S320). For example, the estimation circuit 234 sums up power of at least one frequency bin corresponding to the frequency $f_{01}$ in the signal $S_{D2}$, in order to determine the power $lf_{01}$. With this analogy, the estimation circuit 234 is able to determine the power $hf_{11}$, the power $lf_{02}$, and the power $hf_{12}$. The estimation circuit 234 divides the power $lf_{01}$ by the power $hf_{11}$, in order to determine a power ratio $lf_{01}/hf_{11}$ of the first set of signal components SIG1 (i.e., operation S330). The estimation circuit 234 divides the power $lf_{02}$ by the power $hf_{12}$, in order to determine the power ratio $lf_{02}/hf_{12}$ of the second set of signal components SIG2 (i.e., operation S330).

If a frequency of a signal component is higher, the signal component will suffers higher channel attenuation. In other words, if the frequency of the signal component is lower, the power of the signal component is higher. Moreover, if the length of the channel is longer, the attenuation caused from the channel is higher. Therefore, the power ratio of the power of the low frequency signal component (e.g., the power $lf_{01}$ or the power $lf_{02}$) to the power of the high frequency signal component (e.g., the power $hf_{11}$ or the power $hf_{12}$) is able to indicate the channel length. If the power ratio is greater, the channel length is longer. Alternatively, if the power ratio is less, the channel length is shorter.

In some embodiments, the estimation circuit 234 determines to utilize the power ratio $lf_{01}/hf_{11}$ or the power ratio $lf_{02}/hf_{12}$ to generate the channel estimated information $S_{D3}$ according to the RFI information $S_{CC}$, the power $lf_{01}$, the power $hf_{11}$, the power $lf_{02}$, and the power $hf_{12}$ (i.e., operations S340 and S350). Operations regarding herein will be described with reference to operations S403 to S409 in FIG. 4. In some embodiments, the estimation circuit 234 stores a lookup table (not shown) which stores multiple channel lengths and corresponding power ratios. The estimation circuit 234 compares the selected power ratio with the multiple power ratios, in order to determine the channel length corresponding to the selected power ratio, and to output the same as the channel estimated information $S_{D3}$.

Figure 4:
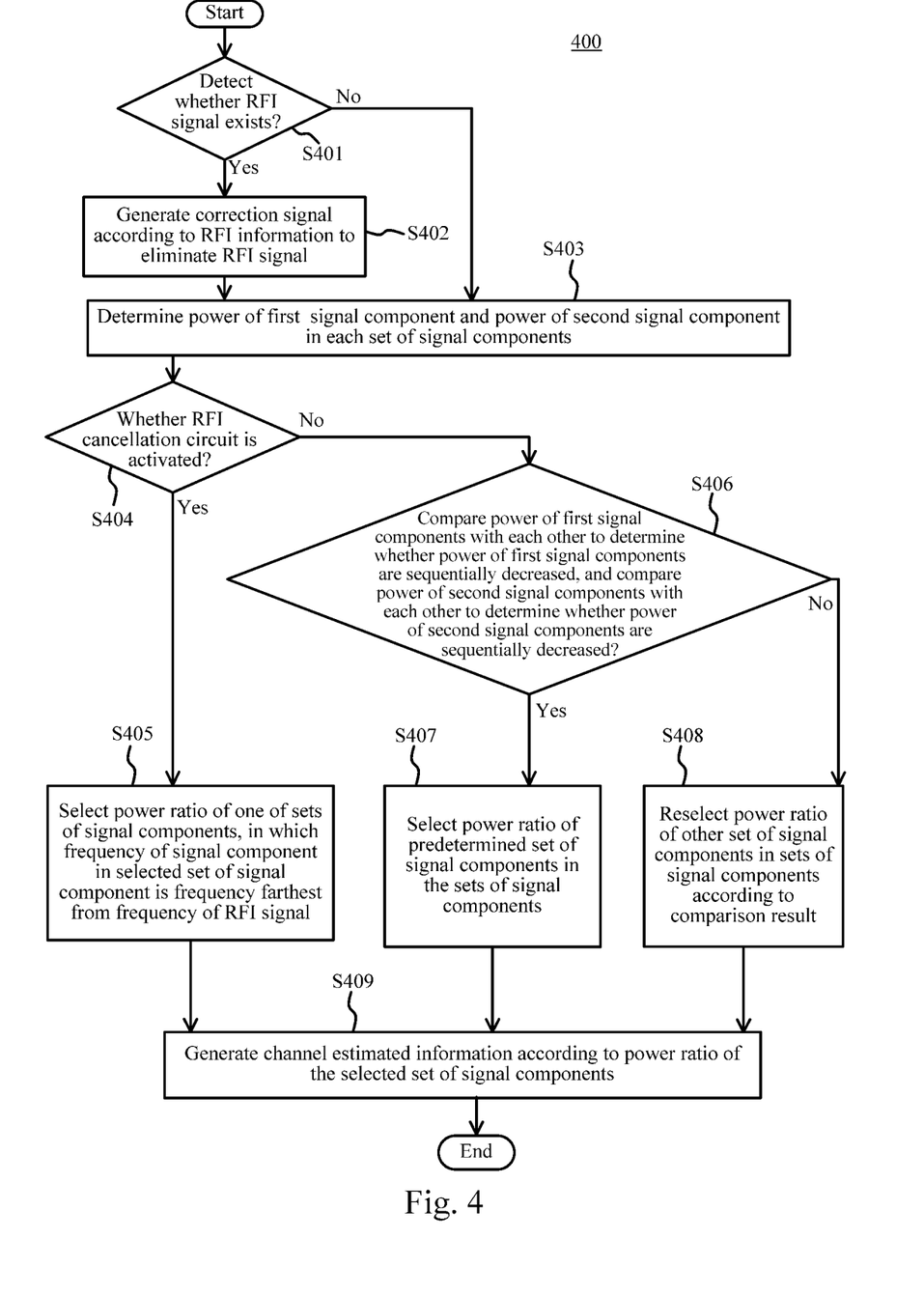
FIG. 4 is a flow chart of a channel estimation method according to some embodiments of the present disclosure.

In some embodiments, the estimation circuit 234 may be implemented with a state machine that performs operations in FIG. 3 and operations S403 to S409 in FIG. 4. In some embodiments, the state machine may be implemented with one or more digital signal processor circuit(s).

FIG. 4 is a flow chart of a channel estimation method 400 according to some embodiments of the present disclosure. In some embodiments, operations of the channel estimation method 400 may be performed by the receiver 100 in FIG. 1. For example, operations S401 and S402 may be performed by the RFI cancellation circuitry 120, and operations S403-S409 may be performed by the channel estimation circuitry 130.

In operation S401, whether the RFI signal exists is detected. If the RFI signal exists, operation S402 is performed. Alternatively, if the RFI signal does not exists (or the power of the RFI signal is too low, and thus the RFI signal is unable to be detected), operation S403 is performed. In operation S402, a correction signal is generated according to the RFI information, in order to eliminate the RFI signal. For example, the RFI detector circuit 122 detects whether the RFI signal exists according to the data signal $S_4$. If the RFI signal exists, the RFI detector circuit 122 further determines the frequency $f_{RFI}$ and the power $V_{RFI}$ of the RFI signal, and generates the RFI information $S_{CC}$ accordingly. The RFI cancellation circuit 124 generates the correction signal $S_{C4}$ according to the RFI information $S_{CC}$ to adjust the data signal $S_4$, in order to reduce impacts from the RFI signal.

In operation S403, power of a first signal component and power of a second signal component in each set of signal components are determined. In operation S404, whether the RFI cancellation circuit is activated is determined. If the RFI cancellation circuit 124 is activated, operation S405 is performed. If the RFI cancellation circuit 124 is not activated, operation S406 is performed. In some embodiments, the estimation circuit 234 determines whether the RFI cancellation circuit 124 is activated according to the RFI information $S_{CC}$. For example, if the RFI signal is detected in operation S401, the RFI cancellation circuit 124 is activated. Alternatively, if the RFI signal is not detected in operation S401, the RFI cancellation circuit 124 is not activated.

In operation S405, the power ratio of one set in the sets of signal components is selected, in which the frequency of the signal component in the selected set of signal components is a frequency farthest from the frequency of the RFI signal in the sets of signal components. In response to the RFI information $S_{CC}$, the estimation circuit 234 is able to acquire whether the RFI signal exists and the information of the frequency $f_{RFI}$. Taking FIG. 3 as an example, the RFI signal exists and the frequency $f_{01}$ of the first set of signal components SIG1 is farthest from the frequency $f_{RFI}$. After the RFI cancellation circuit 124 reduces the impacts from the RFI signal, the estimation circuit 234 selects the power ratio $lf_{01}/hf_{11}$ of the first set of signal components SIG1, in order to generate the channel estimated information $S_{D3}$. Under a condition where the existence of the RFI signal is detected, the calculation of the power of the signal components may be inaccurate. For example, if the frequency $f_{RFI}$ is close to the frequency $f_{12}$, the signal component $M_{12}$ will be affected by the RFI signal, and thus the power $hf_{12}$ may be increased by mistake. As a result, if the power ratio $lf_{02}/hf_{12}$ is selected to estimate the channel length, an inaccurate result may be obtained. Under the condition where the existence of the RFI signal is detected, as the frequency $f_{01}$ is the frequency farthest from the frequency $f_{RFI}$, the impacts from the RFI signal on the first set of signal components SIG1 is relatively lower. Under this case, the estimation circuit 234 selects the power ratio $lf_{01}/hf_{11}$ of the first set of signal components SIG1 that includes the signal component $M_{01}$ to estimate the channel length.

It should be understood that the descriptions given above are for illustrative purposes, and the present disclosure is not limited thereto. As mentioned above, the frequency $f_{RFI}$ may be among the frequencies, lower than the frequency $f_{01}$, or higher than the frequency $f_{12}$. In other examples, if the frequency $f_{02}$ or the frequency $f_{12}$ in the second set of signal components SIG2 is the frequency farthest from the frequency $f_{RFI}$ the estimation circuit 234 selects the power ratio $lf_{02}/hf_{12}$ of the second set of signal components SIG2 in operation S405.

In operation S406, power of first signal components are compared with each other, in order to determine whether the power of the first signal components are sequentially decreased, and power of second signal components are compared with each other, in order to determine whether the power of the signal components are sequentially decreased. If the power of the first signal components and the power of the second signal components are sequentially decreased, operation S407 is performed. Alternatively, if the powers of the first signal components (or the second signal components) are not sequentially decreased, operation S408 is performed. In operation S407, the power ratio of a predetermined set of signal components in the sets of signal components is selected. In operation S408, the power ratio of another set of signal components in the sets of signal components is re-selected. In operation S409, the channel estimated information is generated according to the power ratio of the selected set of signal component.

For example, as shown in FIG. 3, the estimation circuit 234 determines the power $lf_{01}$ (i.e., the power of the signal component $M_{01}$ in the first set of signal components SIG1), the power $hf_{11}$ (i.e., the power of the second signal component $M_{11}$ in the first set of signal components SIG1), the power $lf_{02}$ (i.e., the power of the first signal component $M_{02}$ in the second set of signal components SIG2), and the power $hf_{12}$ (i.e., the power of the second signal component $M_{12}$ in the second set of signal components SIG2). The estimation circuit 234 further compares the power $lf_{01}$ with the power $lf_{02}$, and compares the power $hf_{11}$ with the power $hf_{12}$. As mentioned above, if the frequency of the signal component is higher, the signal loss of the signal component will be higher. Therefore, the power $lf_{01}$ should be higher than the power $lf_{02}$, and the power $hf_{11}$ should be higher than the power $hf_{12}$. Under this condition, the estimation circuit 234 determines that the power of the signal components is correct. In this example, the second set of signal components SIG2 having the higher frequency may be the predetermined set of signal components. Accordingly, the estimation circuit 234 may select the power ratio $lf_{02}/hf_{12}$ of the second set of signal components SIG2, in order to generate the channel estimated information $S_{D3}$.

If the RFI signal is not able to be detected or is not able to be completely eliminated, the remaining RFI signal (or other noises) may affect the signal component $M_{02}$ or the signal component $M_{12}$. Under this condition, the power $lf_{02}$ or the power $hf_{12}$ may be increased by mistake. As a result, the power $lf_{01}$ is not higher than the power $lf_{02}$, or the power $hf_{11}$ is not higher than the power $hf_{12}$. According to this comparison result, the estimation circuit 234 determines that the power $lf_{02}$ and/or the power $hf_{12}$ are inaccurate, and should not select the second set of signal components SIG2. As a result, the estimation circuit 234 selects the power ratio of other set of signal components (which may be, in this example, the first set of signal components SIG1 having the lowest frequency), in order to generate the channel estimated information $S_{D3}$.

With the above operations, it can be assured that the channel estimation circuitry 130, under the impacts from the RFI signal, selects an accurate set of signal components, in order to generate the accurate channel estimated information $S_{D3}$ according to this set of signal components.

For illustrative purposes, the above embodiments are given with examples where two sets of signal components SIG1 and SIG2, but the present disclosure is not limited thereto. According to practical requirements, the channel estimation circuitry 130 is able to analyze two or more sets of signal components, in order to generate the channel estimated information $S_{D3}$.

The above description of operations in FIG. 3 or FIG. 4 includes exemplary operations, but the operations are not necessarily performed in the order described above. The order of the above operations can be changed, or the operations can be executed simultaneously or partially simultaneously as appropriate, in accordance with the spirit and scope of various embodiments of the present disclosure.

As described above, the receiver and the channel estimation method provided in some embodiments of the present disclosure are able to reduce impacts from the RFI signal, and to generate accurate channel estimation information under the impacts from the RFI signal. As a result, a convergence speed of circuits in the receiver can be improved more efficiently.

Various functional components or blocks have been described herein. As will be appreciated by persons skilled in the art, in some embodiments, the functional blocks will preferably be implemented through circuits (either dedicated circuits, or general purpose circuits), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A receiver, comprising:
   an equalizer circuit configured to process a first data signal according to a control signal, in order to generate a second data signal;
   a radio frequency interference cancellation circuitry configured to detect a radio frequency interference signal according to the second data signal to generate radio frequency interference information, and to output a correction signal according to the radio frequency interference information, in order to correct the second data signal; and
   a channel estimation circuitry configured to analyze a first power of a first signal component and a second power of a second signal component in each of a plurality of sets of signal components in the second data signal, compare the first power of the first signal component in each of the plurality of sets of signal components with each other, and compare the second power of the second signal component in each of the plurality of sets of signal components with each other, in order to utilize a power ratio of one of the plurality of sets of signal components to generate the control signal.

2. The receiver of claim 1, wherein a first frequency of the first signal component is lower than a second frequency of the second signal component, the first frequency of the first signal component in a first set of signal component in the plurality of sets of signal components is lower than the first frequency of the first signal component in a second set of signal component in the plurality of sets of signal components, and the second frequency of the second signal component in the first set of signal components is lower than the second frequency of the second signal component in the second set of signal components.

3. The receiver of claim 2, wherein if the channel estimation circuitry determines that the radio frequency interference signal is detected according to the radio frequency interference information, the first frequency of the first signal component or the second frequency of the second signal component in the one of the plurality of sets of signal component is a frequency farthest from a frequency of the radio frequency interference signal in the plurality of sets of signal components.

4. The receiver of claim 2, wherein if the channel estimation circuitry determines that the radio frequency interference signal is not detected according to the radio frequency interference information, the channel estimation circuitry is further configured to determine whether the first power of the first signal components in the plurality of sets of signal components are sequentially decreased, and to determine whether the second power of the second signal components in the plurality of sets of signal components are sequentially decreased.

5. The receiver of claim 4, wherein if the first power of the first signal components are sequentially decreased and the second power of the second signal components are sequentially decreased, the one of the plurality of sets of signal components is a predetermined set of signal components.

6. The receiver of claim 5, wherein the predetermined set of signal components is the second set of signal components.

7. The receiver of claim 5, wherein if the first power of the first signal components are not sequentially decreased or the second power of the second signal components are not sequentially decreased, the channel estimation circuitry selects other set of signal components in the plurality of sets of signal components, in order to generate the control signal.

8. The receiver of claim 7, wherein the first frequency of the first signal component in the other set of signal components is a lowest frequency of the plurality of sets of signal components.

9. The receiver of claim 1, wherein the channel estimation circuitry comprises:
   a transforming circuit configured to transform the second data signal to a frequency domain signal;
   a multiplier circuit configured to multiply the frequency domain signal with the frequency domain signal, in order to generate a first signal;
   an accumulator circuit configured to accumulate the first signal, in order to generate a second signal;
   an estimation circuit configured to analyze the plurality of sets of signal components according to the second signal, in order to generate channel estimation information; and
   a control circuit configured to generate the control signal according to the channel estimation information.

10. The receiver of claim 9, wherein the estimation circuit is configured to:
    select the one of the plurality of sets of signal components from the plurality of sets of signal components according to the radio frequency interference information;
    analyze the first power of the first signal component and the second power of the second signal component in each of the plurality of sets of signal components; and
    compare the first power of the first signal component in each of the plurality of sets of signal components with each other, and compare the second power of the second signal component in each of the plurality of sets of signal components with each other, in order to determine whether to generate the channel estimation information according to the power ratio.

11. A channel estimation method, comprising:
    performing an equalization on a first data signal in response to channel estimation information, in order to generate a second data signal;
    detecting a radio frequency interference signal according to the second data signal to output radio frequency interference information and output a correction signal according to the radio frequency interference information to correct the second data signal; and
    analyzing a first power of a first signal component and a second power of a second signal component in each of a plurality of sets of signal components in the second data signal, comparing the first power of the first signal component in each of the plurality of sets of signal components with each other, and comparing the second power of the second signal component in each of the plurality of sets of signal components with each other, in order to utilize a power ratio of one of the plurality of sets of signal components according to the radio frequency interference information to generate the channel estimation information.

12. The channel estimation method of claim 11, wherein a first frequency of the first signal component is lower than a second frequency of the second signal component, the first frequency of the first signal component in a first set of signal component in the plurality of sets of signal components is lower than the first frequency of the first signal component in a second set of signal component in the plurality of sets of signal components, and the second frequency of the second signal component in the first set of signal components is lower than the second frequency of the second signal component in the second set of signal components.

13. The channel estimation method of claim 12, wherein if the radio frequency interference signal is detected, the first frequency of the first signal component or the second frequency of the second signal component in the one of the plurality of sets of signal component is a frequency farthest from a frequency of the radio frequency interference signal in the plurality of sets of signal component.

14. The channel estimation method of claim 12, wherein analyzing the first power of the first signal component and the second power of the second signal component in each of the plurality of sets of signal components in the second data signal, comparing the first power of the first signal component in each of the plurality of sets of signal components with each other, and comparing the second power of the second signal component in each of the plurality of sets of signal components with each other, in order to utilize the power ratio of one of the plurality of sets of signal components according to the radio frequency interference information to generate the channel estimation information comprises:

if the radio frequency interference signal is not detected, determining whether the first power of the first signal components in the plurality of sets of signal components are sequentially decreased, and determining determine whether the second power of the second signal components in the plurality of sets of signal components are sequentially decreased.

15. The channel estimation method of claim 14, wherein if the first power of the first signal components are sequentially decreased and the second power of the second signal components are sequentially decreased, the one of the plurality of sets of signal components is a predetermined set of signal components.

16. The channel estimation method of claim 15, wherein the predetermined set of signal components is the second set of signal components.

17. The channel estimation method of claim 14, further comprising:

if the first power of the first signal components are not sequentially decreased or the second power of the second signal components are not sequentially decreased, selecting other set of signal components in the plurality of sets of signal components, in order to generate the control signal.

18. The channel estimation method of claim 17, wherein the first frequency of the first signal component in the other set of signal components is a lowest frequency of the plurality of sets of signal components.

19. The channel estimation method of claim 11, wherein analyzing the first power of the first signal component and the second power of the second signal component in each of the plurality of sets of signal components in the second data signal, comparing the first power of the first signal component in each of the plurality of sets of signal components with each other, and comparing the second power of the second signal component in each of the plurality of sets of signal components with each other, in order to utilize the power ratio of one of the plurality of sets of signal components according to the radio frequency interference information to generate the channel estimation information comprises:

transforming the second data signal to a frequency domain signal;

multiplying the frequency domain signal with the frequency domain signal, in order to generate a first signal;

accumulating the first signal, in order to generate a second signal;

analyzing the plurality of sets of signal components according to the second signal, in order to generate the channel estimation information; and generating the control signal according to the channel estimation information.

20. The channel estimation method of claim 19, wherein analyzing the first power of the first signal component and the second power of the second signal component in each of the plurality of sets of signal components in the second data signal, comparing the first power of the first signal component in each of the plurality of sets of signal components with each other, and comparing the second power of the second signal component in each of the plurality of sets of signal components with each other, in order to utilize the power ratio of one of the plurality of sets of signal components according to the radio frequency interference information to generate the channel estimation information comprises:

selecting the one of the plurality of sets of signal components from the plurality of sets of signal components according to the radio frequency interference information;

analyzing the first power of the first signal component and the second power of the second signal component in each of the plurality of sets of signal components; and comparing the first power of the first signal component in each of the plurality of sets of signal components with each other, and comparing the second power of the second signal component in each of the plurality of sets of signal components with each other, in order to determine whether to generate the channel estimation information according to the power ratio.

* * * * *